3,644,448
CRYSTALLINE HYDRATES OF ALKALI METAL SALTS OF ZINC TRANS-1,2-DIAMINOCYCLO-HEXANE-N,N,N',N'-TETRAACETATE
Robert C. O'Neill, Newark, N.J., assignor to Cooper, Tinsley Laboratories, Inc., Mystic, Conn.
No Drawing. Original application Jan. 3, 1967, Ser. No. 606,576, now Patent No. 3,501,576, dated Mar. 17, 1970. Divided and this application Nov. 13, 1969, Ser. No. 871,289
Int. Cl. C08f *3/06*
U.S. Cl. 260—429.9   3 Claims

ABSTRACT OF THE DISCLOSURE

The crystalline hydrates of the sodium and potassium salts of the zinc chelate of trans-1,2-diaminocyclohexane-N,N,N',N'-tetraacetic acid ($Na_2ZnCDTA$ and $K_2ZnCDTA$)

---

This application is a division of application Ser. No. 606,576, filed Jan. 3, 1967, now U.S. Pat. No. 3,501,576.

This invention relates to treatment of hypertension, and in particular provides new chemical compounds useful in appropriate dosage form in the treatment of hypertension in humans.

The compounds of this invention are the disodium and dipotassium salts of the zinc chelate of trans-1,2 diaminocyclohexane-N,N,N',N'-tetraacetic acid, the acid per se being commonly known as CDTA. The compounds of this invention can be represented by the structural formulae:

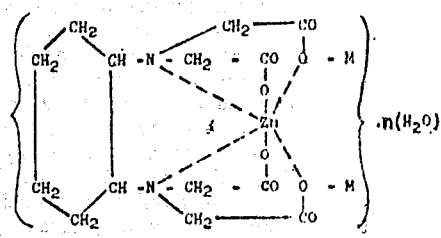

where M represents sodium or potassium ions and $n$ is a low number up to 4. The lower hydrates which are obtained, for example, when the compounds are evaporated to constant dryness are highly hygroscopic and tend to pick up moisture to form the tetrahydrate which is stable. For the purposes of this invention there is no preference between the anhydrous salts and the various hydrates. As a matter of convenience their quantities are therefore better described by the amount of zinc present, i.e., the zinc equivalent.

$Na_2ZnCDTA$ and $K_2ZnCDTA$ can be used orally and parenterally in doses to provide the equivalent of as much as 40 mg. of zinc daily per kilogram of body weight. Generally lower levels are preferred. The preferred route of administration is orally over a period of at least several days.

According to this invention, the $Na_2ZnCDTA$ and $K_2ZnCDTA$ can be associated with a carrier which can be either a solid material or a sterile parenteral liquid. The compositions can take the form of tablets, powders, capsules, or other dosage forms which are particularly useful for oral ingestion. Liquid diluents are employed in sterile condition for parenteral use, that is, by injection. Such a medium can be a sterile solvent such as water. The compositions can take the form of active material, namely, $Na_2ZnCDTA$ or $K_2ZCDTA$ or both, admixed with solid diluents, tableting adjuvants, such as cornstarch, lactose, talc, stearic acid, magnesium stearate, gums, or the like. Any of the tableting materials used in pharmaceutical practice can be employed where there is no incompatibility with the $Na_2ZnCDTA$ and $K_2ZnCDTA$. The material can be tableted with or without adjuvants. Alternatively $Na_2ZnCDTA$ or $K_2ZnCDTA$ or both with adjuvant material can be placed in the usual capsule or resorbable material such as the usual gelatine capsule and administered in that form. $Na_2ZnCDTA$ and $K_2ZnCDTA$ can also be put up into powder packets. Alternatively $Na_2ZnCDTA$ or $K_2ZnCDTA$ or both can be prepared in the form of a suspension in a material in which $Na_2ZnCDTA$ and $K_2ZnCDTA$ are not soluble.

EXAMPLE I 445.7 grams of trans-1,2 diaminocyclohexane-N,N,N',N'-tetraacetic acid monohydrate (1.2 moles, 98% pure) were suspended in 360 ml. distilled water in a 4 liter beaker. 240 ml. of 10 N NaOH (2.4 moles) were added with stirring, after which 266 grams zinc acetate dihydrate (1.2 moles, 99% pure) dissolved in 775 ml. distilled water were added with stirring.

The pH of the reaction mixture after complete addition of NaOH solution was 4.9 and was 3.9 after complete addition of the zinc acetate dihydrate solution. The resulting solution was evaporated overnight on a steam bath to yield a white crystalline magma which was then dried to constant weight at 62° C. (20 mm. Hg) in a vacuum oven containing alkali flakes as a desiccant. The resultant crude product (584 grams) was then recrystallized by dissolving it in a hot (75° C.) solvent mixture consisting of 3900 ml. ethanol and 987 ml. distilled water, filtering with gravity, and chilling the clear solution thus obtained to 5° C. The copious crystalline precipitate which formed was collected by vacuum filtration, washed on the funnel with ethanol, and dried to constant weight at 68–75° C. under reduced pressure (0.1 mm. Hg). In this manner, 411.6 g. of product was obtained corresponding approximately to the monohydrate of disodium zinc trans - 1,2 - diaminocyclohexane-N,N,N',N'-tetraacetate (hereinafter the recrystallized monohydrate will be described as the "monohydrate of Example I").

A sample of the monohydrate of Example I was analyzed for carbon, hydrogen, nitrogen and zinc, as follows:

|  | Percent | | | |
|---|---|---|---|---|
|  | C | H | N | Zn |
| Found (average) | 35.4 | 5.2 | 5.2 | 13.7 |
| Calculated (as monohydrate) | 35.6 | 4.3 | 5.9 | 13.8 |

The loss-on-drying, as determined at 70° C., was 1.0%. The monohydrate of Example I was further examined microscopically under plane polarized light and appeared to be entirely crystalline. Viewed microscopically, after grinding with mortar and pestle, the monohydrate of Example I is a colorless, crystalline, free-flowing powder. Its melting point could not be determined, as it decomposed abruptly at 390° C. after preliminary shrinking commencing at 320° C. On exposure of a sample to air for 24 hours the weight uptake (moisture) at equilibrium was 10.2%, equal to 2.7 waters of hydration. The material remained crystalline.

EXAMPLE II

A suspension of trans-1,2-diaminocyclohexane-N,N,N',N'-tetraacetic acid monohydrate (93 g., 98% pure, 0.25 mole) in 100 ml. of distilled water was prepared.

To this was added a solution of 33 g. (0.5 mole) of potassium hydroxide pellets (85.9% assay) in 50 ml. of distilled water. A clear solution resulted. To this solution was added 55.4 g. (0.25 mole) of zinc acetate dihydrate (99% pure). After a brief period of stirring, a clear solution resulted. This was filtered and was then concentrated in vacuo to yield a crystalline residue. Recrystallization of this residue from a mixture of methanol and acetone gave 90 g. of colorless crystals. After having been dried to constant weight at room temperature under a vacuum of 0.1 mm., the compound was subjected to analysis for zinc content. The calculated value, based on dipotassium zinc trans-1,2-diaminocyclohexane-N,N,N',N'-tetraacetate monohydrate, is 13.0%. Found: 12.9%. This free-flowing crystalline product, hereinafter referred to as the monohydrate of Example II, readily dissolved in water yielding a clear, colorless solution.

The compounds of the present invention are highly useful in solution form because of their high solubility in water and because aqueous solutions of these compounds are neutral. These properties are illustrated in Example III.

EXAMPLE III

Two grams of the monohydrate of Example I were added to 5 ml. of distilled water, yielding a clear solution. The following data were recorded:

| Time | Temperature | pH |
|---|---|---|
| 0 minutes | 23.5° C. (ambient) | |
| 2 do | 28.0° C | 6.5 |
| 4 do | 26.0° C | 6.5 |
| 10 do | | 6.5 |

The following examples are illustrative of typical dosage forms for administering the compounds of this invention to humans in the treatment of hypertension. The formulations are made by the usual procedures for making tablets, enteric coated tablets, gelatine capsules, packets and oral and parenteral solutions.

EXAMPLE IV

[Oral tablets, equivalent to 25 mg. zinc]

| | Parts by weight | | |
|---|---|---|---|
| Example | IV A | IV B | IV C |
| Monohydrate of— | | | |
| Example I | 182 | | 91 |
| Example II | | 193 | 96 |
| Corn starch | 100 | 96 | 98 |
| Lactose | 193 | 186 | 190 |
| Gelatine | 20 | 20 | 20 |
| Magnesium stearate | 5 | 5 | 5 |

The above formulations are each mixed and tabletted to form 500 mg. tablets which are suitable for oral administration to humans in treatment of hypertension to provide the equivalent of 25 mg. zinc per tablet.

EXAMPLE V

When desired any of the tablets of Example IV can be coated with a solution of cellulose acetate phthalate to comply with U.S.P. specifications for enteric coated tablets.

EXAMPLE VI

[Gelatin capsules, equivalent to 50 mg. zinc]

| | Parts by weight | | |
|---|---|---|---|
| Example | VI A | VI B | VI C |
| Monohydrate of— | | | |
| Example I | 362 | | 181 |
| Example II | | 385 | 192 |
| Corn starch | 138 | 115 | 127 |

The above ingredients are mixed and dispensed in gelatin capsules, 500 mg. per capsule, to provide a suitable dosage form for oral administration to humans in treatment of hypertension at a rate of 50 mg. zinc per capsule.

EXAMPLE VII.—ORAL SOLUTION

| Example | VII A | VII B | VII C |
|---|---|---|---|
| Monohydrate of— | | | |
| Example I, grams | 7.25 | | 3.12 |
| Example II, grams | | 7.70 | 3.85 |
| Sorbitol 70%, ml | 10 | 10 | 10 |
| Cyclamate, sodium, mg | 100 | 100 | 100 |
| Methyl paraben, mg | 1.8 | 1.8 | 1.8 |
| Propyl paraben, mg | 0.2 | 0.2 | 0.2 |
| Flavor | | | |
| Color | | | |
| Distilled deionized water to make up to (ml.) | 100 | 100 | 100 |

The above ingredients are dissolved in water, as indicated, to form suitable solutions for oral administration to humans in treatment of hypertension at a rate of 50 mg. of zinc per 5 ml.

EXAMPLE VIII.—PARENTERAL SOLUTIONS

| Example | VIII A | VIII B | VIII C |
|---|---|---|---|
| Monohydrate of Example I, mg | 182.0 | | 91 |
| Monohydrate of Example II, mg | | 193 | 96 |
| Benzyl alcohol, mg | 5.0 | 5.0 | 5.0 |
| Sodium chloride, mg | 5.0 | | 5.0 |
| Potassium chloride, mg | | 5.0 | |
| Potassium biphthalate, mg | 8.0 | 8.0 | 8.0 |
| Water for injection to make up to (ml.) | 1.0 | 1.0 | 1.0 |

The above solutions are suitable for parenteral injection in 1 ml. dosages in humans in treatment of hypertension and provides 25 mg. of zinc per ml.

I claim:
1. The crystalline hydrates of the sodium and potassium salts of the zinc chelate of trans-1,2-diaminocyclohexane-N,N,N',N'-tetraacetic acid.
2. The crystalline hydrates of the disodium salt of the zinc chelate of trans-1,2-diaminocyclohexane-N,N,N',N'-tetraacetic acid.
3. The crystalline hydrates of the dipotassium salt of the zinc chelate of trans-1,2-diaminocyclohexane-N,N,N',N'-tetraacetic acid.

References Cited

UNITED STATES PATENTS

| 3,150,160 | 9/1964 | Dexter | 260—429.9 X |
| 3,240,701 | 3/1966 | Furia | 260—429.9 X |

FOREIGN PATENTS

| 785,024 | 10/1957 | Great Britain | 260—429 J |

OTHER REFERENCES

Pribil et al., Collection Czechoslov. Chem. Conamum., vol. 18, pp. 43–52 (1953).

Day et al., Analytical Chemistry, vol. 37, pp. 1326–33 (1965).

Leonard et al., Proceedings of the Florida State Horticultural Society, vol. 69, pp. 72–79 (1956).

TOBIAS E. LEVOW, Primary Examiner

H. M. S. SNEED, Assistant Examiner

U.S. Cl. X.R.

260—429 J; 424—289